United States Patent
Aubin

(10) Patent No.: US 10,608,465 B2
(45) Date of Patent: Mar. 31, 2020

(54) DEVICE FORMING AN INTERFACE BETWEEN AN AUXILIARY POWER SUPPLY SYSTEM AND A POWER GENERATION MODULE IN A RAIL VEHICLE

(71) Applicant: FAIVELEY TRANSPORT TOURS, Saint-pierre-des-corps (FR)

(72) Inventor: Philippe Aubin, Chanceaux sur Choisille (FR)

(73) Assignee: FAIVELEY TRANSPORT TOURS, Saint-Pierre-des-Corps (FR)

(*) Notice: Subject to any disclaimer, the term of this patent is extended or adjusted under 35 U.S.C. 154(b) by 105 days.

(21) Appl. No.: 14/781,729

(22) PCT Filed: Apr. 1, 2014

(86) PCT No.: PCT/FR2014/050773
§ 371 (c)(1),
(2) Date: Oct. 1, 2015

(87) PCT Pub. No.: WO2014/162090
PCT Pub. Date: Oct. 9, 2014

(65) Prior Publication Data
US 2016/0043593 A1 Feb. 11, 2016

(30) Foreign Application Priority Data
Apr. 2, 2013 (FR) .................................... 13 52977

(51) Int. Cl.
*H02J 9/06* (2006.01)
*H02J 7/00* (2006.01)
(Continued)

(52) U.S. Cl.
CPC .............. *H02J 9/06* (2013.01); *H02J 7/0003* (2013.01); *H02M 3/02* (2013.01); *H02M 3/155* (2013.01); *H02J 7/0029* (2013.01); *H02J 2207/20* (2020.01)

(58) Field of Classification Search
CPC .......... H02J 9/06; H02J 7/0003; H02J 7/0029; H02J 2007/0059; H02J 2207/20; H02M 3/155; H02M 3/02
See application file for complete search history.

(56) References Cited

U.S. PATENT DOCUMENTS 8,143,856 B2 * 3/2012 Andrea .................. H02J 7/022
320/109
2005/0279242 A1 12/2005 Maier et al.
(Continued)

FOREIGN PATENT DOCUMENTS

EP 2204893 7/2010
FR 2919768 2/2009
(Continued)

OTHER PUBLICATIONS

International Search Report, dated Aug. 20, 2014, from corresponding PCT application.

*Primary Examiner* — Jung Kim
(74) *Attorney, Agent, or Firm* — Young & Thompson

(57) ABSTRACT

A device (2) forming an interface between an auxiliary power supply system (1) and a power generation module (3) in a rail vehicle, the power generation module (3) being designed to charge a first type of auxiliary power supply system with electrical energy, includes elements of connection to the power generation module (3) and to a second type of auxiliary power supply system (1), the second type of auxiliary power supply system differing from the first type of auxiliary power supply system, and the interface device (2) includes interface elements designed for the operation of (Continued)

Figure 1:
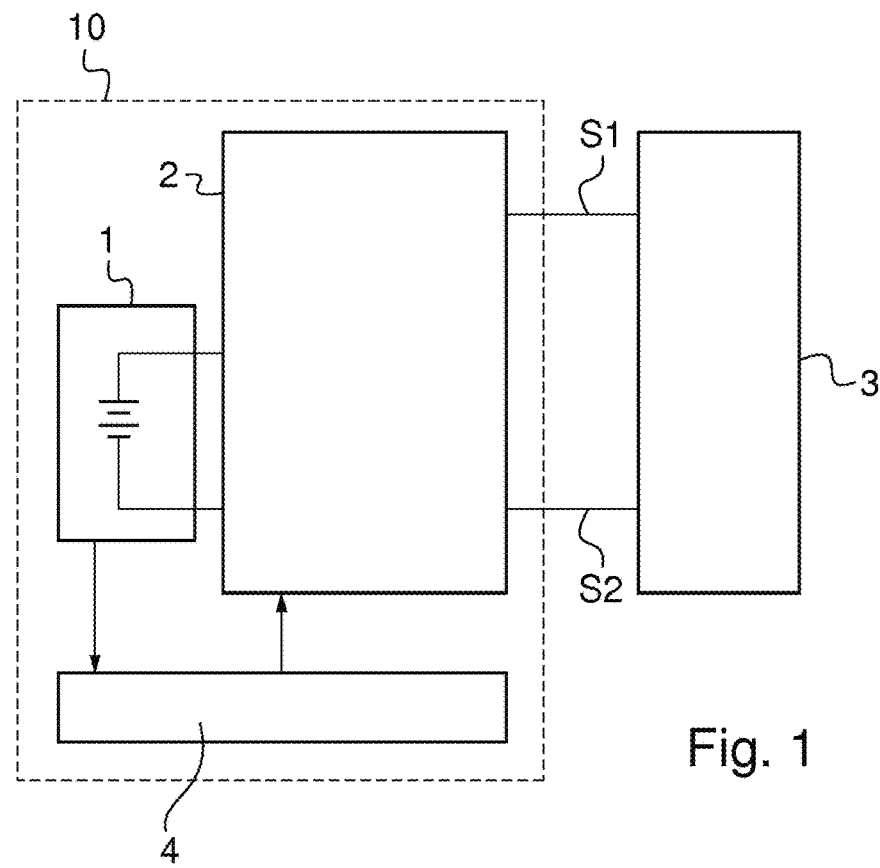

the second type of auxiliary power supply system (1) in combination with the power generation module (3).

13 Claims, 1 Drawing Sheet

(51) Int. Cl.
*H02M 3/02* (2006.01)
*H02M 3/155* (2006.01)

(56) References Cited

U.S. PATENT DOCUMENTS

2011/0163722 A1    7/2011   Gale et al.
2013/0304299 A1   11/2013   Bevard et al.

FOREIGN PATENT DOCUMENTS

| WO | 2012/084281 A2 | 6/2012 |
| WO | 2013038441 | 3/2013 |

* cited by examiner

DEVICE FORMING AN INTERFACE BETWEEN AN AUXILIARY POWER SUPPLY SYSTEM AND A POWER GENERATION MODULE IN A RAIL VEHICLE

The present invention concerns an interface device forming an interface between an auxiliary power supply system and a power generation module in a rail vehicle.

Rail vehicles that are electric, for example electric trains, are equipped with an auxiliary power supply system or backup batteries in order to supply electrical energy to the train in case of absence of power supply by means of the main power supply system, for example in case of non-availability of the catenary or electrical power supply rail, for example due to a failure or a passage of the rail vehicle into a zone in which the electricity network is absent.

The majority of current trains are equipped with a type of auxiliary power supply system, as well as chargers designed to charge that type of auxiliary power supply system with electrical energy, that type of auxiliary power supply system mainly being batteries of Ni—Cd (Nickel-Cadmium) type.

These batteries must be charged in order to be able to supply certain electrical circuits of the train with electrical energy in case of failure or absence of the main supply system.

Ni—Cd batteries must be replaced regularly (approximately every 10 years) on account of their ageing.

These Ni—Cd batteries today have become obsolete and other types of batteries that have better performance, are less bulky, less polluting and safer are available on the market.

Nevertheless, the power generation modules or battery chargers available in current trains are designed to supply the batteries of type Ni—Cd with electrical energy. Thus, when the battery has to be replaced, the charger also has to be replaced, involving high costs.

The present invention is directed to enabling the replacement of the auxiliary power supply system independently of the power generation module used to charge the auxiliary power supply system.

To that end, according to a first aspect of the present invention there is provided an interface device for forming an interface between an auxiliary power supply system and a power generation module in a rail vehicle, the power generation module being designed to charge a first type of auxiliary power supply system with electrical energy.

According to the invention, the interface device comprises means for connecting to said power generation module and to a second type of auxiliary power supply system, the second type of auxiliary power supply system being different from the first type of auxiliary power supply system, and the interface device comprises interface means designed for the operation of said second type of auxiliary power supply system in combination with said power generation module.

Thus, the power generation module which is designed to operate with one type of auxiliary power supply system in the rail vehicle, that is to say which is designed to charge an auxiliary power supply system of a first type with electrical energy, may be kept when replacing that auxiliary power supply system with an auxiliary power supply system of a second type.

It is to be noted that a type of auxiliary power supply system is equivalent to an auxiliary power supply system implemented according to a technology, for example according to the Ni—Cd technology, and that a power generation module is associated with the auxiliary power supply system in order to charge it with electrical energy.

The costs of replacement of the auxiliary power supply system are thus not increased by the additional replacement of the power generation module.

Furthermore, on replacement of the auxiliary power supply system, the power generation module is kept, which reduces the risk of malfunctions due to the change in the group formed by the auxiliary power supply system and the power generation module (which was operating properly).

To be precise, when the power generation module has defects and does not operate, the auxiliary power supply system, although being charged, cannot supply electrical energy.

According to a feature, the power generation module comprising charging means designed to deliver energy, the interface means comprise means for transferring energy delivered by the charging means of the power generation module to the second type of auxiliary power supply system.

In particular, during the operation of the second type of auxiliary power supply system in combination with the power generation module, the interface means comprise means for transferring energy delivered by the power generation module to the second type of auxiliary power supply system.

By virtue of these means, the auxiliary power supply system is charged with electrical energy coming from the power generation module.

The charged auxiliary power supply system is thus ready to supply certain parts of the rail vehicle with electrical energy in case of necessity.

According to another feature, the interface means further comprise means for transferring electrical energy coming from the second type of auxiliary power supply system to the power generation module.

By virtue of these means, the electrical energy accumulated in the auxiliary power supply system is transferred to the main power supply system or main electricity network.

This energy coming from the auxiliary power supply system serves to power certain electrical circuits of the rail vehicle.

Advantageously, the interface means comprise safety means mounted in parallel with said other type of auxiliary power supply system.

The safety means prevent the auxiliary power supply system from being short-circuited thereby avoiding it being damaged and increasing its operational availability.

To be precise, the auxiliary power supply system could be short-circuited, for example if the power generation module or the interface device is defective.

By virtue of the invention, even if the power generation module or the interface device has defects, the auxiliary power supply system would not be short-circuited, damage to it being avoided.

This is of the utmost importance in the field of rail since the power supply of certain circuits in case of failure of the main power supply system is indispensable at all times.

According to a feature, the interface means comprise energy storage means.

Thus, the transfer of electrical energy between the auxiliary power supply system and the power generation module is controlled.

For example, the other type of auxiliary power supply system is a battery of Lithium Iron Phosphate type.

According to a second aspect, the present invention concerns a group comprising an auxiliary power supply system and an interface device for forming an interface between said auxiliary power supply system and a power generation module in a rail vehicle in accordance with the invention.

According to a third aspect, the present invention concerns a rail vehicle comprising an interface device for forming an interface between an auxiliary power supply system and a power generation module in accordance with the invention.

This assembly and this rail vehicle have similar advantages to those described above with reference to the interface device for forming an interface between an auxiliary power supply system and a power generation module according to the invention.

Still other particularities and advantages of the invention will appear in the following description.

Figure 2:
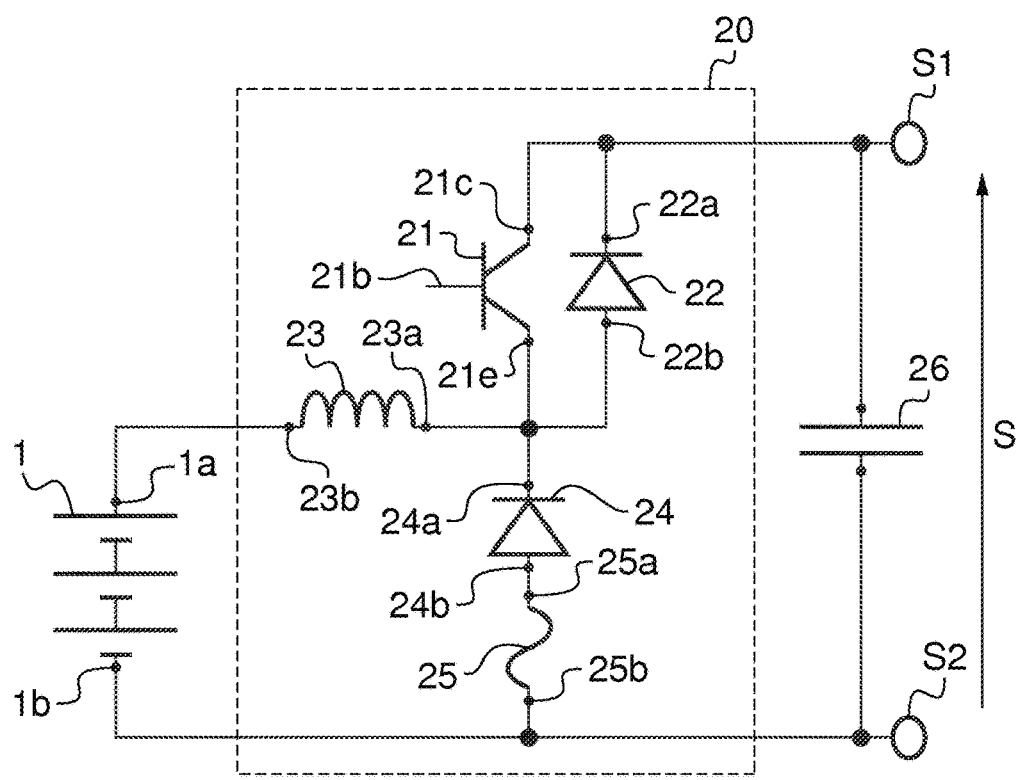

In the accompanying drawings, given by way of non-limiting example:

FIG. 1 represents an interface device in accordance with the invention disposed between an auxiliary power supply system and a power generation module; and FIG. 2 represents an embodiment of an interface device for forming an interface between an auxiliary power supply system and a power generation module in accordance with the invention.

FIG. 1 represents an interface device 2 connected to an auxiliary power supply system 1 and to a power generation module 3.

Rail vehicles are supplied with electrical energy by means of a main power supply network or system (not shown in the drawings).

Auxiliary power supply systems 1 are present in the vehicles in order to generate electrical energy at certain parts of the vehicle in the case of absence of power supply by means of the main power supply system.

The auxiliary power supply system 1 is for example a battery or electrical storage battery.

The battery 1 is charged with electrical energy by means of a power generation module 3. The power generation module 3 is for example a battery charger.

Thus, in the example embodiment described, the auxiliary power supply system 1 is a battery 1 and the power generation module 3 is a battery charger 3.

It should be noted that even though the battery 1 is of a second type, that is to say that it is implemented according to a second technology, the power generation module 3 was designed to operate in combination with a first type of battery, that is to say that it was designed to delivery electrical energy to a first type of battery.

Most current rail vehicles are equipped with batteries of Ni—Cd type or technology (first type of battery), as well as battery chargers which were designed to operate in combination with that type of battery.

In a described embodiment, the battery 1 (second type of battery) is a battery of Lithium Iron Phosphate (LiFePO$_4$) type, known by the term LFP battery. These types of battery have a good power density, an increased life and good ratios between quantity of energy stored and size relative to batteries of Ni—Cd conventionally used.

Of course, the second types of batteries 1 may be different, for example Lithium-Nickel-Cobalt-Aluminum (NCA) or Lithium-Nickel-Manganese Cobalt (NMC).

In the described embodiment, the battery charger 3 is designed to operate in combination with batteries of type Ni—Cd.

Of course battery chargers may be designed to operate in combination with batteries of different types.

The battery 1 of second type and the battery charger 3 are linked via an interface device 2. An embodiment of this interface device 2 will be described with reference to FIG. 2.

Below in this document, the term battery 1 corresponds to a battery 1 of the second type.

Control means 4 are suitable for managing the operation of an assembly 10 formed by the interface device 2 and the battery 1.

In particular, the control means 4 configure the interface device 2 such that the battery 1 is in charge or discharge mode, the charge mode corresponding to a mode in which the battery 1 is charged with electrical energy coming from the battery charger 3, and the discharge mode corresponding to a mode in which the battery 1 supplies electrical energy to certain parts of the rail vehicle.

FIG. 2 represents a battery 1 and an embodiment of the interface device 2 in accordance with the invention.

The interface device 2 comprises connection means for connection to the battery charger 3 and to the batteries of LFP type. In this example, the connection means are electrical connectors suitable for establishing an electrical connection between the battery 1 and the interface device 2, and between the battery charger 3 and the interface device 2.

The interface device 2 further comprises interface means 20 designed for the operation of the battery of LFP type in combination with the battery charger 3 designed to operate in combination with batteries of Ni—Cd type.

Thus, rail vehicles which had been equipped with batteries of a first type, for example of Ni—Cd type and battery chargers designed to operate with that type of battery, may today be updated with batteries of other type without however having to replace the battery chargers.

The interface means 20 of the interface device 2 comprise transfer means for transferring energy delivered by the battery charger 3 to the battery 1.

These transfer means for transferring energy delivered by the battery charger 3 are designed to electrically link the battery 1 and the charger 3 such that the battery 1 is electrically charged.

In this described embodiment, the transfer means for transferring energy delivered by the battery charger 3 comprise a charge transistor 21.

This charge transistor 21 may be of different types, for example a Field Effect Transistor (FET), for example a MOSFET, JFET or other type, or a bipolar transistor, or for instance a hybrid bipolar and FET transistor, for example an IGBT transistor.

When the charge transistor 21 is controlled to operate, the energy coming from the battery charger 3 is directed to the battery 1.

The interface means 20 further comprise transfer means for transferring electrical energy coming from the battery 1 to the battery charger 3.

These transfer means for transferring electrical energy coming from the battery 1 to the battery charger 3 are designed to electrically link the battery 1 and the battery charger 3 such that the electrical energy which was stored in the battery 1 is transferred to the network or main supply system of the vehicle.

In the described embodiment, the transfer means for transferring electrical energy coming from the battery 1 to the battery charger 3 comprise a discharge diode 22.

The interface means 20 further comprise safety means 24, 25 mounted in parallel with the battery 1.

In the described example, the safety means comprise a safety diode 24 and a fuse 25.

Thus, the safety means 24, 25 avoid the battery 1 being in a short-circuit configuration, which would damage the battery 1.

Therefore, the safety means 22, 24 protect the battery 1 from the possible defects in the interface device 2 and in the battery charger 3 which could give rise to it being damaged The proper operation of the battery 1 is thus ensured, even though the battery charger 3 or the interface device 2 may present defects.

It will be noted that it is essential in the field of rail for the battery 1 to provide electrical energy to certain electrical circuits at the time of failures of the main power supply system.

The interface means 20 further comprise energy accumulation means. In this example, the energy accumulation means comprise an inductor 23.

This inductor 23 is adapted to store electrical energy coming from the battery charger 3 or coming from the battery 1.

When the battery 1 is in charge mode, that is to say that it is charged by the electrical energy delivered by the battery charger 3, the inductor 23 stores that electrical energy coming from the battery charger 3 and then releases that energy to the battery 1.

When the battery 1 is in discharge mode, that is to say when it supplies parts of the rail vehicle, the inductor 23 stores the energy coming from the battery 1 and then releases it to the battery charger 3 and the main power supply network.

The topology of the interface device 2 according to an embodiment will now be described.

The interface device 2 described with reference to FIG. 2 comprises a charge transistor 21 linked by its collector 21$c$ to the cathode 22$a$ of the discharge diode 22, that discharge diode 22 being connected by its anode 22$b$ to the emitter 22$e$ of the charge transistor 21.

This charge transistor is a bipolar transistor of NPN type here.

A driver circuit (not illustrated) is linked to the base 21$b$ of the charge transistor 21. The driver receives a control signal coming from control means 4 enabling the charge transistor 21 to be placed in operating state or cut-off state.

The control signal may be generated by a PWM controller (PWM standing for "Pulse Width Modulation").

Thus, in one example, the energy transferred to the battery 1 is thus controlled according to the pulse width of the control signal.

The emitter 21$e$ of the charge transistor 21 as well as the anode 22$b$ of the discharge diode 22 are linked to a first terminal 23$a$ of the inductor 23.

This inductor 23 is linked by a second terminal 23$b$ to the positive terminal 1$a$ of the battery 1.

The anode 22$b$ of the discharge diode 22, the first terminal 23$a$ of the inductor 23 and the emitter 21$e$ of the charge transistor 21 are linked to the cathode 24$a$ of the safety diode 24. The anode 24$b$ of the safety diode 24 is linked to the fuse 25, that fuse 25 being furthermore linked to the negative terminal 1$b$ of the battery 1.

Thus, the safety diode 24 and the fuse 25 are disposed in parallel with the battery 1.

The cathode 22$a$ of the discharge diode 22, as well as the collector 21$c$ of the charge transistor 21 constitute the positive terminal s1 of the output s of the interface device 2.

The negative terminal of the battery 1, as well as the second terminal 25$b$ of the fuse 25 constitute the negative terminal s2 of the output s of the interface device 2.

An output capacitor 26 is disposed at the output s of the interface device 2, in order to constitute a potential difference between the positive terminal s1 and the negative terminal s2 of the output s.

The connection of the interface device 2 to the battery charger 3 is made through the positive terminal s1 and the negative terminal s2 of the output of the interface device 2.

It will thus be noted that the positive terminal s1 and the negative terminal s2 of the output of the interface device constitute connection means of the interface device 2 to the battery charger 3.

The operation of the interface device described above will next be described.

When the battery 1 is in charge mode, that is to say when it is charged with electrical energy by the battery charger 3, the charge transistor 21 is put into a passing mode or operating mode, and the discharge diode 22 as well as the safety diode 24 do not conduct.

As the safety diode 24 is not conducting, it has no influence on the operation in charge mode of the battery 1.

Thus, a charge current (not shown in the drawing) flows from the battery charger 3 to the inductor 23, the electrical energy delivered by the battery charger 3 being stored in the inductor 23.

This electrical energy stored in the inductor 23 is transferred to the battery 1 which charges until it is fully charged.

By virtue of the presence of this inductor 26, the charge current flowing from the battery charger 3 to the battery 1 is under control.

This inductor is dimensioned such that it is suitable for bearing the passage of the current from the battery charger 3 to the battery 1 in charge mode.

When the battery 1 is in discharge mode, that is to say when it must supply certain parts of the rail vehicle, the charge transistor 21 is put into cut-off mode.

The discharge diode 22 conducts, and a discharge current (not shown in the drawing) coming from the battery 1 and from the inductor 23 passes through the discharge diode 22 to arrive at the main power supply network.

As for the case wherein the battery 1 is in charge mode, because the safety diode 24 is not conducting, it has no influence on the operation in discharge mode of the battery 1.

It should be noted that the battery charger 3 is unidirectional, that is to say that it can send energy but does not consume energy.

As in the case of the charging of the battery 1, when discharge current flows from the battery 1 to the battery charger 3, electrical energy is stored by the inductor 23, that inductor 23 then releasing the electrical energy in order to supply electrical circuits which in normal circumstances are powered by the main power supply network.

It should be noted that when the battery 1 is in discharge mode, the inductor may operate in saturation.

The safety diode 24, as well as the fuse 25 are disposed in parallel with the battery 1 in order to protect it from a possible short circuit.

Thus, when the diode must be in non-conducting state and is in conducting state, the fuse 25 is destroyed by the current flowing through the diode, which prevents the short-circuiting of the battery 1.

By virtue of the invention, the batteries present in rail vehicles, in particular batteries of Ni—Cd type, may be replaced by batteries of other type, in particular by batteries of LFP type, without replacing the battery charger.

Thus, the costs of replacing an obsolete battery by a battery with better performance and safety are not incremented by the replacement of the battery charger.

Furthermore, the interface device in accordance with the invention could be installed in vehicles other than rail vehicles.

The invention claimed is:

1. An interface device (2) for forming an interface between a first auxiliary power supply system (1) implemented according to a first technology and a power generation module (3) in a rail vehicle, said power generation module (3) being designed to charge with electrical energy a second auxiliary power supply system implemented according to a second technology different from the first technology used for implementing said first auxiliary power supply system (1), wherein said interface device (2) comprises:
   means for connecting to said power generation module (3) and to said first auxiliary power supply system (1),
   interface means (20) designed for the operation of said first auxiliary power supply system (1) in combination with said power generation module (3), said first auxiliary power supply system (1) being in a charge mode in which the first auxiliary power supply system (1) is charged with electrical energy coming from the power generation module (3), and in a discharge mode in which the first auxiliary power supply system (1) supplies energy to the rail vehicle,
   said interface means (20) comprising
   safety means (24, 25) mounted in parallel with said first auxiliary power supply system (1) such that
   i) when the power generation module (3) is defective, said safety means (24, 25) prevent said first auxiliary power supply system (1) from being short-circuited,
   ii) when the interface device (2) is defective, said safety means (24, 25) prevent said first auxiliary power supply system (1) from being short-circuited, and
   iii) when the first auxiliary power supply system (1) is in discharge mode, the first auxiliary power supply system (1) supplies electrical energy to the rail vehicle,
   wherein in a single configuration the interface device is operable in both the charge mode and in the discharge mode,
   wherein the power generation module (3) comprise charging means designed to deliver energy, said interface means (20) comprise first means for transferring electrical energy (21) delivered by the charging means of said power generation module (3) to said first auxiliary power supply system (1), and
   wherein said interface means (20) further comprise second means for transferring electrical energy (22) coming from said first auxiliary power supply system (1) to the power generation module (3), said second means for transferring electrical energy (22) coming from said first auxiliary power supply system (1) to the power generation module (3) being arranged in parallel with said first means for transferring electrical energy (21) delivered by the charging means of said power generation module (3) to said first auxiliary power supply system (1).

2. An interface device according to claim 1, wherein the interface means (20) comprise energy storage means (23).

3. An interface device according to claim 1, wherein said first auxiliary power supply system (1) is a battery of Lithium Iron Phosphate type.

4. A group (10) comprising an auxiliary power supply system (1) and an interface device (2) in accordance with claim 1.

5. A rail vehicle comprising an interface device in accordance with claim 1.

6. An interface device according to claim 2, wherein said first auxiliary power supply system (1) is a battery of Lithium Iron Phosphate type.

7. An interface device (2) for forming an interface between a first auxiliary power supply system (1) implemented according to a first technology and a power generation module (3) in a rail vehicle, said power generation module (3) being designed to charge with electrical energy a second auxiliary power supply system implemented according to a second technology different from the first technology used for implementing said first auxiliary power supply system (1), wherein said interface device (2) comprises:
   means for connecting to said power generation module (3) and to said first auxiliary power supply system (1),
   interface means (20) designed for the operation of said first auxiliary power supply system (1) in combination with said power generation module (3), said first auxiliary power supply system (1) being in a charge mode in which the first auxiliary power supply system (1) is charged with electrical energy coming from the power generation module (3), and in a discharge mode in which the first auxiliary power supply system (1) supplies energy to the rail vehicle,
   said interface means (20) comprising
   safety means (24, 25) mounted in parallel with said first auxiliary power supply system (1) such that
   i) when the power generation module (3) is defective, said safety means (24, 25) prevent said first auxiliary power supply system (1) from being short-circuited,
   ii) when the interface device (2) is defective, said safety means (24, 25) prevent said first auxiliary power supply system (1) from being short-circuited, and
   iii) when the first auxiliary power supply system (1) is in discharge mode, the first auxiliary power supply system (1) supplies electrical energy to the rail vehicle,
   wherein in a single configuration the interface device is operable in both the charge mode and in the discharge mode, and
   wherein said interface means (20) further comprise first means for transferring electrical energy (21) for charging of said power generation module (3) to said first auxiliary power supply system (1) and second means for transferring electrical energy (22) coming from said first auxiliary power supply system (1) to the power generation module (3), said second means for transferring electrical energy (22) coming from said first auxiliary power supply system (1) to the power generation module (3) and said first means for transferring electrical energy (21) for charging of said power generation module (3) to said first auxiliary power supply system (1) being connected in parallel with each other and in series with said safety means (24, 25).

8. An interface device according to claim 7, wherein the interface means (20) comprise energy storage means (23).

9. An interface device according to claim 7, wherein said first auxiliary power supply system (1) is a battery of Lithium Iron Phosphate type.

10. An interface device according to claim 9, wherein the interface means (20) comprise energy storage means (23).

11. An interface device (2) for forming an interface between a first auxiliary power supply system (1) implemented according to a first technology and a power generation module (3) in a rail vehicle, said power generation module (3) being designed to charge with electrical energy a second auxiliary power supply system implemented according to a second technology different from the first technology used for implementing said first auxiliary power supply system (1), wherein said interface device (2) comprises means for connecting to said power generation module (3) and to said first auxiliary power supply system (1), and the interface device (2) comprises interface means (20) designed for the operation of said first auxiliary power supply system (1) in combination with said power generation module (3), said first auxiliary power supply system (1) being in a charge mode in which the first auxiliary power supply system (1) is charged with electrical energy coming from the power generation module (3), and in a discharge mode in which the first auxiliary power supply system (1) supplies energy to the rail vehicle, said interface means (20) comprising safety means (24, 25) mounted in parallel with said first auxiliary power supply system (1), said safety means (24, 25) comprising i) a security diode (24) and ii) a fuse (25) such that when either the power generation module is defective or when the interface device is defective, said fuse (25) prevents said first auxiliary power supply system (1) from being short-circuited and when the first auxiliary power supply system (1) is in discharge mode, the first auxiliary power supply system (1) supplies electrical energy to the rail vehicle, wherein in a single configuration the interface device is operable in both the charge mode and in the discharge mode, wherein said fuse (25) and said security diode (24) are connected in series to each other, and wherein said interface means (20) comprise first means for transferring electrical energy (21) for charging of said power generation module (3) to said first auxiliary power supply system (1), and second means for transferring electrical energy (22) coming from said first auxiliary power supply system (1) to the power generation module (3), the first means for transferring electrical energy (21) for charging of said power generation module (3) to said first auxiliary power supply system (1) being connected in parallel to the second means for transferring electrical energy (22) coming from said first auxiliary power supply system (1) to the power generation module (3), and the first means for transferring electrical energy (21) for charging of said power generation module (3) to said first auxiliary power supply system (1) and the second means for transferring electrical energy (22) coming from said first auxiliary power supply system (1) to the power generation module (3) being connected in series with said safety means (24, 25).

12. An interface device according to claim 11, wherein said first auxiliary power supply system (1) is a battery of Lithium Iron Phosphate type.

13. An interface device (2) according to claim 11, wherein the power generation module (3) comprise charging means designed to deliver energy.

* * * * *